Patented Sept. 19, 1922.

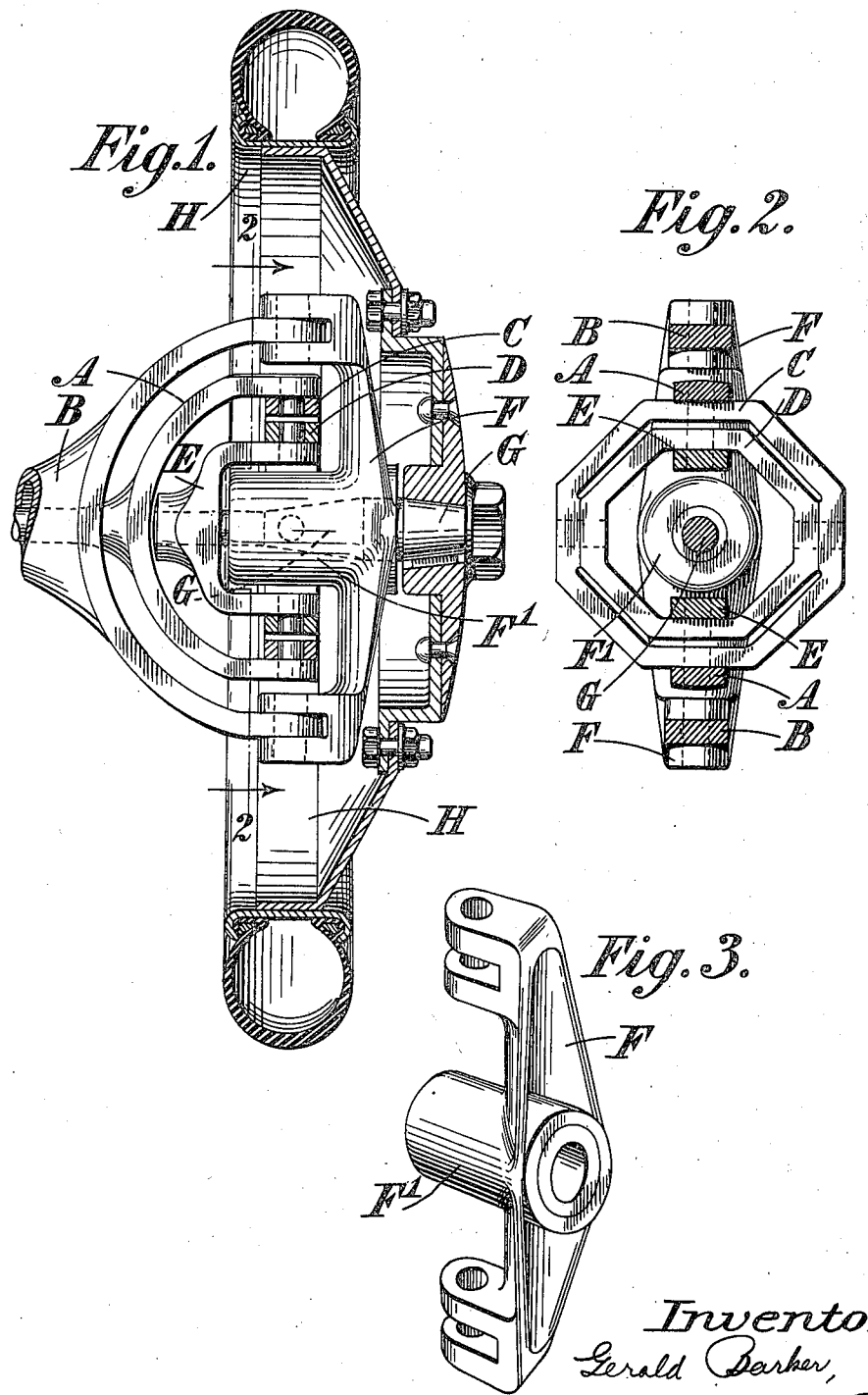

1,429,271

UNITED STATES PATENT OFFICE.

GERALD BARKER, OF LONDON, ENGLAND.

UNIVERSAL SHAFT COUPLING.

Application filed January 7, 1922. Serial No. 527,613.

*To all whom it may concern:*

Be it known that I, GERALD BARKER, a subject of the King of England, residing in London, England, have invented certain new and useful Improvements in Universal Shaft Couplings, of which the following is a specification.

This invention is for improvements in or relating to universal joints and their application to combined steering and driving wheels, and has for its main object to provide a compact form of universal joint for use with road wheels having combined steering and driving means.

According to this invention the joint comprises a driving-member pivoted at opposite sides to a gimbal-like member about an axis which passes through the axis of rotation of the driving-member, a second gimbal-like member pivoted at opposite sides to the first gimbal member to swing about an axis at right-angles to the axis of pivoting of the driving-member and which intersects the said axis, and a driven-member which is pivoted to opposite sides of the second mentioned gimbal member about an axis which coincides with that of the pivots for the driving-member when the driving- and driven members are in line with each other.

When this joint is applied to a road-wheel of a vehicle which is to be driven and also steered, there may be combined with the parts set forth above a steering-member which spans the joint and is pivoted to swing about a vertical axis which intersects the rotational axis of the driving member, the axes of pivoting of the gimbal-members, and a stub shaft which is mounted in the steering member to rotate therein, has its rotational axis coincident with that of the driven member, projects inwardly from the steering-member and is secured to said driven member to rotate therewith, and a dished road wheel secured to the outer end of said stub shaft with the hollow side towards the joint so that the joint and the steering-member both lie within the road wheel.

The steering-member may be provided with a boss to project inwardly to lie within the said second gimbal-member and constructed to provide a bearing for the stub shaft which extends through it and the driven member may be recessed (for example jawed) to accommodate this boss for the purpose of minimizing the space occupied by the joint and steering-member.

In the accompanying drawings, which illustrate one method of carrying out this invention as applied to road wheels having combined steering and driving means;

Figure 1 is a vertical transverse section through the wheel in the plane of the driving shaft;

Figure 2 is a vertical section through the joint on the line 2—2 of Figure 1 looking towards the wheel; and Figure 3 is a view in perspective of the steering-member.

Like reference letters indicate like parts throughout the various drawings.

A jawed driving member A is mounted to rotate within a hollow axle B and has between its jaws a gimbal-ring C, pivoted to it to swing about an axis intersecting the rotational axis of the driving member. Within the gimbal-ring C is a second gimbal-ring D pivoted to opposite sides of it to swing about an axis intersecting at right-angles the axis of pivoting of the driving member A and also intersecting the rotational axis of said driving-member. Pivoted to opposite sides of the gimbal-ring D to swing about an axis coincident with the axis of pivoting of the driving-member A, is a jawed driven-member E. The stationary hollow axle B is jawed to accommodate the joint and constitute a support to which the steering-member F can be pivoted about a vertical axis intersecting the rotational axis of the driving-member and the axes of pivoting of the gimbal-rings. The steering member F has a boss $F^1$ projecting from it towards the joint, which boss lies within the second gimbal-ring and provides a bearing for a stub-shaft G. Mounted upon the outer end of the stub-shaft is a road wheel, generally indicated by the letter H. The stub-shaft G is secured at its inner end to the driven-member E to rotate therewith about an axis coincident with the rotational axis of the driving-member A when the driven and driving-members are in line with each other. The road wheel H is of the disc type the disc being dished outwardly. The joint and steering-member are housed within the hollow of the dished disc with the point of intersection common to all the pivotal axes lying in the central plane of the tire.

Obviously, the boss $F^1$ of the steering-member F is not essential to the working of the joint, but for the sake of compactness such a construction is preferable.

Further, the steering-member F may be pivoted to any suitable fixed part of the vehicle instead of to the axle B.

The joint according to this invention may be variously applied and when applied as an ordinary universal shafting joint, the construction is substantially as described in its application to a road wheel. The member that is pivoted to the inner gimbal-ring may have a solid head if preferred.

As will be readily understood, the pivots connecting the two gimbal-rings to each other in a joint according to this invention perform the function of the intermediate member of a double Hookes'-joint. A joint according to this invention, therefore, constitutes a compact form of universal joint wherein the driven-member rotates with uniform speed.

What I claim as my invention and desire to secure by Letters Patent is:

1. In a universal joint, the combination with a driving member and a gimbal-member pivotally connected thereto to turn about a pivotal axis that intersects the axis of rotation of the driving member, of a second gimbal-member pivotally connected to the first gimbal-member to turn about an axis that is at right-angles to and intersects the said pivotal axis of the first mentioned gimbal-member, and a driven member pivotally connected to the said second gimbal-member to turn about an axis that is at right-angles to the axis of pivoting of the second gimbal-member.

2. In a universal joint, the combination with a driving member and a gimbal-member pivotally connected thereto to turn about a pivotal axis that intersects the axis of rotation of the driving member, of a second gimbal-member pivotally connected to the first gimbal-member to turn about an axis that is at right-angles to and intersects the said pivotal axis of the first mentioned gimbal-member, and a driven member pivotally connected to the said second gimbal-member to turn about an axis that is at right-angles to and intersects the axis of pivoting of the second gimbal member.

3. In a universal joint, the combination with a driving member and a gimbal-member pivotally connected thereto to turn about a pivotal axis that intersects the axis of rotation of the driving member, of a second gimbal-member pivotally connected to the first gimbal-member to turn about an axis that is at right-angles to and intersects the said pivotal axis of the first mentioned gimbal-member, and a driven member pivotally connected to the said second gimbal-member to turn about an axis that coincides with said pivotal axis.

4. In a universal joint, the combination with a gimbal-member having an opening extending through it, a driving member pivotally connected to opposite sides of the same so that the gimbal-member can turn about a pivotal axis that intersects the axis of rotation of the driving member, of a second gimbal-member pivotally connected to the first gimbal member to turn about an axis that is at right-angles to and intersects the said pivotal axis, one of which gimbal-members is situated within the other, and a driven member pivotally connected to opposite sides of the said second gimbal-member so that the latter can turn about an axis that coincides with said pivotal axis.

5. The combination with a support, a steering member mounted thereon to turn about a pivotal axis, a stub-shaft carried by said steering member, and a wheel carried by said shaft, of a driving member, and a universal joint comprising two gimbal-members whereof one is pivotally connected to said driving member and to the second gimbal-member, and the second gimbal-member is operatively pivotally connected to said shaft, the axes of pivoting of which gimbal-members intersect at a point that is situated in said pivotal axis of said steering member.

6. The combination with a support, a steering-member mounted thereon to turn about a pivotal axis, a stub-shaft carried by said steering-member, and a road wheel carried by said shaft, of a driving member, and a universal joint comprising two gimbal-members whereof one is pivotally connected to said driving member and to the second gimbal-member, and the second gimbal-member is operatively pivotally connected to said shaft, the axes of pivoting of which gimbal-members intersect at a point that is situated in said pivotal axis of said steering member and in the general plane of said wheel.

7. The combination with a universal joint comprising a driving member, a gimbal-member pivotally connected thereto to turn about a pivotal axis that intersects the axis of rotation of the driving member, a second gimbal-member pivotally connected to the first gimbal-member to turn about an axis that is at right-angles to and intersects the said pivotal axis, and a driven member pivotally connected to the said second gimbal-member, of a support, a steering-member which spans the said universal joint and is mounted on said support to turn about a vertical axis which intersects the axis of rotation of the driving member and the axis of pivoting of the second gimbal-member to the first, a stub-shaft which is mounted in the steering-member to rotate therein and so that its axis of rotation can be in alinement with that of the said driven member, which shaft projects towards said joint from the steering-member and is secured at its inner end to said driven member to rotate therewith, and a dished road-wheel secured to the outer end of said stub-shaft with the hollow side towards the said joint so that the universal joint and the steering-member are both located within the road-wheel.

8. The combination with a universal joint comprising a driving member, a gimbal-member pivotally connected thereto to turn about a pivotal axis that intersects the axis of rotation of the driving member, a second gimbal-member pivotally connected to the first gimbal-member to turn about an axis that is at right-angles to and intersects the said pivotal axis of the first mentioned gimbal-member, and a driven member, having an axial recess, pivotally connected to the said second gimbal-member; of a support, a steering-member which spans the said joint, is mounted on said support to turn about a vertical axis which intersects the axis of rotation of the said driving member and the axis of pivoting of the second gimbal-member to the first, which steering member has a boss that extends within the said second gimbal-member and within said recess, a stub-shaft journalled in and extending through said boss and secured at its inner end to the driven member to rotate therewith, and a dished road-wheel secured to the outer end of said stub-shaft with the hollow side towards the joint, which joint and the said steering member are located within the road-wheel, and said shaft having its axis of rotation coincident with that of said driven member when the said wheel is in its normal position.

9. The combination with a universal joint comprising a horizontal forked driving member, a ring-shaped gimbal-member pivotally mounted in the fork to turn about a vertical pivotal axis that intersects the axis of rotation of the driving member, a second ring-shaped gimbal-member pivotally connected within the first to turn about an axis that is at right-angles to and intersects said pivotal axis, and a horizontal forked driven member pivotally connected to opposite sides of the said second gimbal-member; of a horizontal axle having a forked end, a steering-member pivotally mounted on the fork of the said axle to swing about said pivotal axis, and having a boss that extends through said second gimbal-member and into the fork of said driven member, a stub-shaft journalled in said boss and having its inner end secured to said driven member, and a dished road-wheel mounted on the outer end of said stub-shaft with its hollow side towards the said joint, the said joint and the said steering member being located in the general plane of the road wheel.

In testimony whereof I affix my signature.

GERALD BARKER.